United States Patent
Trekell et al.

(10) Patent No.: US 12,158,590 B2
(45) Date of Patent: Dec. 3, 2024

(54) LENS MOUNTING SYSTEMS WITH FLEXURES COUPLED TO THE LENS

(71) Applicant: Apple Inc., Cupertino, CA (US)

(72) Inventors: Blake N Trekell, San Francisco, CA (US); Aidan N Zimmerman, Poway, CA (US); Clas Magnus Oscar Oldenbo, Ekero (SE); Andrew Nichols, San Diego, CA (US); Ransomed I Adebayo, Milpitas, CA (US); Peter Pilarz, San Diego, CA (US); Jesse Melrose, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/326,540

(22) Filed: May 31, 2023

(65) Prior Publication Data

US 2024/0192505 A1 Jun. 13, 2024

Related U.S. Application Data

(60) Provisional application No. 63/431,394, filed on Dec. 9, 2022.

(51) Int. Cl.
*G02B 27/01* (2006.01)
*G02B 7/02* (2021.01)

(52) U.S. Cl.
CPC ......... *G02B 27/0176* (2013.01); *G02B 7/028* (2013.01); *G02B 2027/0159* (2013.01)

(58) Field of Classification Search
CPC ................................................ G02B 27/0176
USPC ............................................................ 345/8
See application file for complete search history.

(56) References Cited

U.S. PATENT DOCUMENTS

| | | | |
|---|---|---|---|
| 9,555,589 B1 | 1/2017 | Ambur et al. | |
| 10,268,042 B2 | 4/2019 | Kamakura | |
| 10,394,028 B2 | 8/2019 | Takagi et al. | |
| 11,340,464 B2 | 5/2022 | Kamakura | |
| 2011/0109891 A1* | 5/2011 | Farnsworth | G03F 7/70825 |
| | | | 219/69.11 |
| 2015/0077701 A1* | 3/2015 | de Juan, Jr. | G02C 7/022 |
| | | | 351/159.04 |
| 2019/0212546 A1* | 7/2019 | Sohn | F03G 7/06 |
| 2020/0218029 A1* | 7/2020 | Zack | G02B 7/021 |

(Continued)

FOREIGN PATENT DOCUMENTS

| | | |
|---|---|---|
| EP | 3910404 A2 | 11/2021 |
| WO | 0052515 A1 | 9/2000 |

*Primary Examiner* — Long D Pham
(74) *Attorney, Agent, or Firm* — Treyz Law Group, P.C.; G. Victor Treyz; David K. Cole

(57) ABSTRACT

A head-mounted device may include optical assemblies for presenting images to a user. The optical assemblies may each have a display for generating an image and a lens that presents the image to a corresponding eye box for viewing by a user. The optical assemblies may have lens barrels. Each lens barrel may have a first end to which a display is mounted and may have an opposing second end. A mount may be used to attach the lens to the second end of the lens barrel. The mount may have at least one flexure. The flexure may have a U-shaped cross-sectional shape. The mount may have a ring-shaped flexure that extends around a peripheral edge of the lens, may have flexure segments, or may have a set of three discrete flexures located at different positions along the edge of the lens.

18 Claims, 6 Drawing Sheets

(56) References Cited

U.S. PATENT DOCUMENTS

| | | |
|---|---|---|
| 2020/0400948 A1 | 12/2020 | Maric et al. |
| 2021/0063744 A1 | 3/2021 | Maric et al. |
| 2021/0294105 A1 | 9/2021 | He et al. |
| 2021/0325625 A1 | 10/2021 | Maric et al. |
| 2021/0325678 A1* | 10/2021 | Maric .................. H04N 13/344 |
| 2023/0299470 A1* | 9/2023 | Jenkins .................. H01Q 1/364 |
| | | 343/718 |

* cited by examiner

LENS MOUNTING SYSTEMS WITH FLEXURES COUPLED TO THE LENS

This application claims the benefit of provisional patent application No. 63/431,394, filed Dec. 9, 2022, which is hereby incorporated by reference herein in its entirety.

FIELD

This relates generally to electronic devices, and, more particularly, to electronic devices such as head-mounted devices.

BACKGROUND

Electronic devices such as head-mounted devices have displays that generate images and lenses that are used in presenting the images to users. Components such as lenses may be sensitive to stress, which raises challenges when mounting lenses in head-mounted devices.

SUMMARY

A head-mounted device may include optical assemblies for presenting images to a user. The optical assemblies may each have a display for generating an image and a lens that presents the image to a corresponding eye box for viewing by a user. The lens may be a catadioptric lens with polymer lens elements that exhibit stress-induced birefringence when subjected to excessive stress.

The optical assemblies may have lens barrels. Each lens barrel may have a first end to which a display is mounted and may have an opposing second end. A lens mount that helps reduce stress in the lens may be used to attach the lens to the second end of the lens barrel. The mount may have at least one flexure. The flexure may have a U-shaped cross-sectional shape. The mount may have a ring-shaped flexure that extends around a peripheral edge of the lens, may have flexure segments, or may have a set of three discrete flexures located at different positions along the edge of the lens.

DETAILED DESCRIPTION

Electronic devices such as head-mounted devices may have displays for displaying images and lenses that are used in presenting the images to eye boxes for viewing by a user. The lenses may be mounted in a head-mounted device using support structures that help minimize lens stress. In an illustrative embodiment, the lenses are mounted in rigid lens supports such as metal lens barrels using lens mounts based on flexures. The flexures help prevent stress from being applied to the lenses even when the electronic devices are subjected to changes in operating temperature that cause the lenses to expand and contract.

Figure 1:
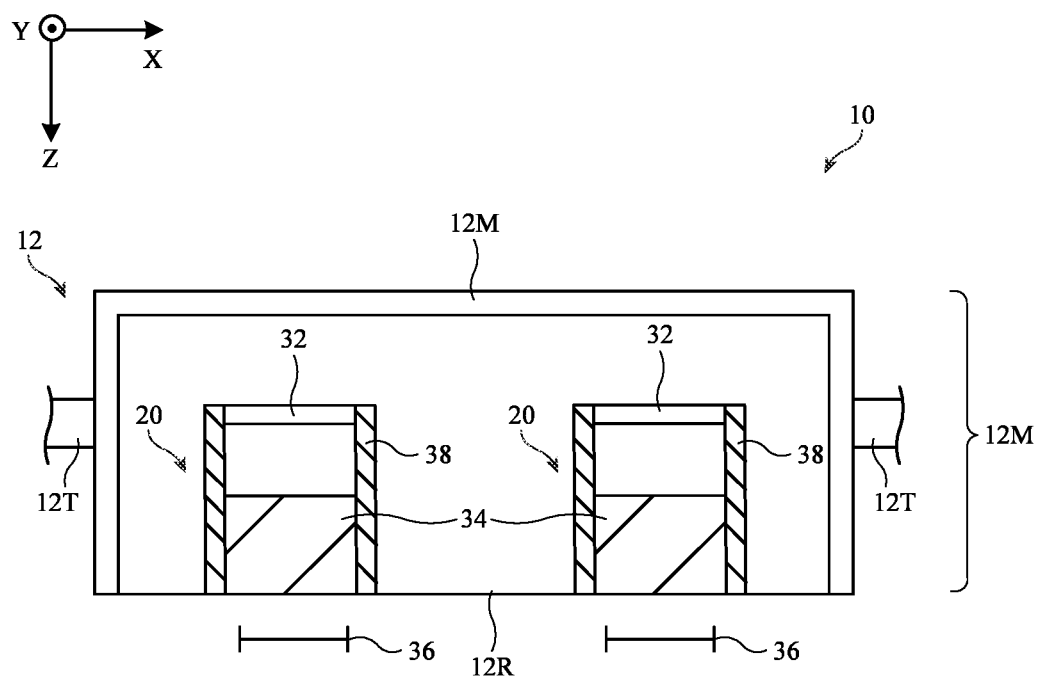
FIG. 1 is a diagram of an illustrative head-mounted device in accordance with an embodiment.

FIG. 1 is a schematic diagram of an illustrative electronic device of the type that may include lenses mounted with flexures. Device 10 of FIG. 1 may be a head-mounted device (e.g., goggles, glasses, a helmet, and/or other head-mounted device. In an illustrative configuration, device 10 is a head-mounted device such as a pair of goggles (sometimes referred to as virtual reality goggles, mixed reality goggles, augmented reality glasses, etc.).

As shown in the illustrative cross-sectional top view of device 10 of FIG. 1, device 10 may have a housing such as housing 12 (sometimes referred to as a head-mounted support structure, head-mounted housing, or head-mounted support). Housing 12 may include a front portion such as front portion 12F and a rear portion such as rear portion 12R. When device 10 is worn on the head of a user, rear portion 12R rests against the face of the user and helps block stray light from reaching the eyes of the user.

Main portion 12M of housing 12 may be attached to head strap 12T. Head strap 12T may be used to help secure main portion 12 on the head and face of a user. Main portion 12M may have a rigid shell formed from housing walls of polymer, glass, metal, and/or other materials. When housing 12 is being worn on the head of a user, the front of housing 12 may face outwardly away from the user and the rear of housing 12 (and rear portion 12R) may face towards the user. In this configuration, rear portion 12R may face the user's eyes located in eye boxes 36.

Device 10 may have electrical and optical components that are used in displaying images to eye boxes 36 when device 10 is being worn. These components may include left and right optical assemblies 20 (sometimes referred to as optical modules). Each optical assembly 20 may have an optical assembly support 38 (sometimes referred to as a lens barrel, optical module support, or support structure). Supports 38 may have hollow tubular shapes or other suitable shapes. Optical assemblies 20 may slide laterally along guide rails to adjust optical-assembly-to-optical-assembly separation to accommodate different user interpupillary distances. Rear portion 12R may include flexible structures (e.g., a flexible polymer layer, a flexible fabric layer, etc.) so that portion 12R can stretch to accommodate movement of assemblies 20.

Each assembly 20 may have a display 32 coupled to one end of support 38 and a lens mounted to an opposing end of support 38. Display 32 has an array of pixels for displaying images. Lens 34 may optionally have a removable vision correction lens for correcting user vision defects (e.g., refractive errors such as nearsightedness, farsightedness, and/or astigmatism). During operation, images displayed by displays 32 may be presented to eye boxes 36 through lenses 34 for viewing by the user.

To help satisfy design constraints (e.g., low weight, compact size, wide field of view, high resolution, etc.), lenses 34 may be catadioptric lenses. A catadioptric lens incorporates optical components such as polarizers and wave plates to create a folded optical path that can help reduce lens size. The use of these polarization-sensitive optical components may, however, make lenses 34 sensitive to performance degradation due to stress-induced birefringence effects. Lenses 34 may, as an example, include lens elements formed from polymers (for example, COC polymer (cyclic olefin copolymer) or other suitable polymers)

that help minimize lens weight, but these polymers may exhibit birefringence when subjected to excess stress.

Satisfactory operation for lenses 34 may be achieved by mounting lenses 34 using lens mounts that help isolate lenses 34 from sources of stress. In an illustrative configuration, supports 38 may be formed from strong rigid materials such as metal (e.g., aluminum, etc.). When operating device 10 over wide temperature ranges (e.g., 0-50° C.), there is a risk that expansion and contraction of materials in assemblies 20 and, more particularly, mismatches in the coefficient of thermal expansion between the polymer of lenses 34 and the metal of supports 38, can give rise to unwanted stress in lenses 34, leading to unwanted stress-induced birefringence in lenses 34. Unwanted temperature-change-induced stress may be avoided by mounting lenses 34 within supports 38 using lens mounts based on flexures.

Figure 2:
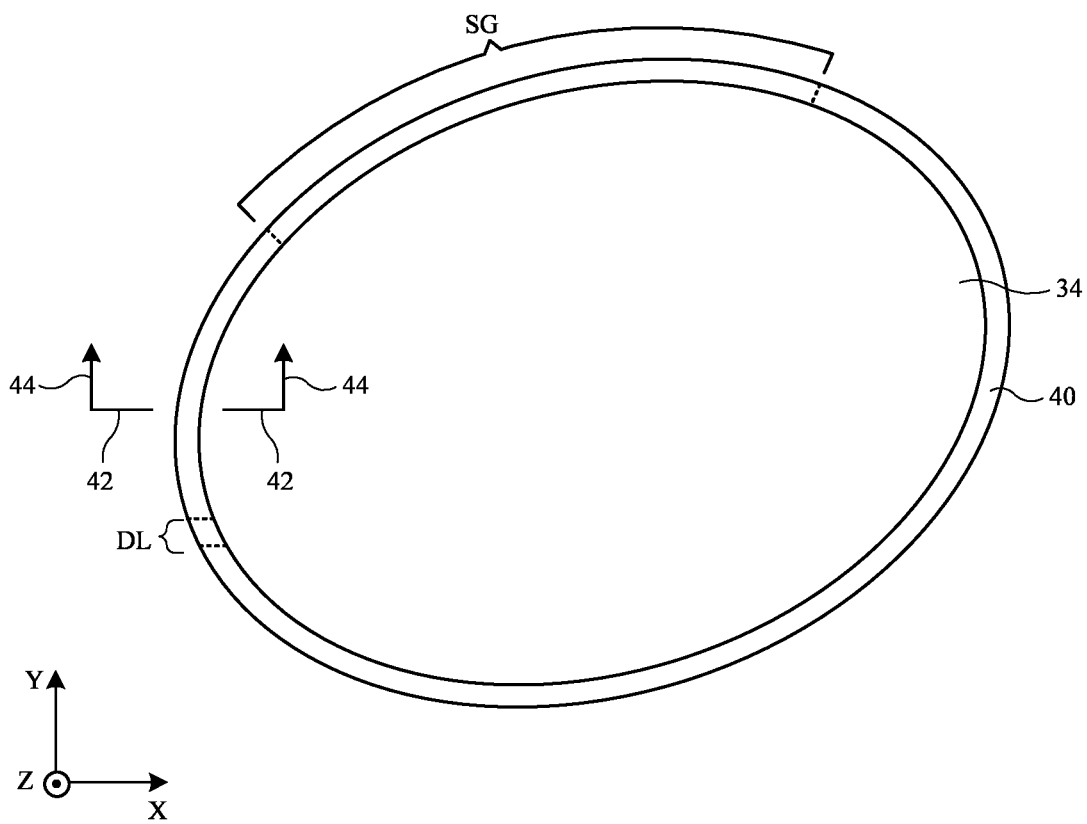
FIG. 2 is a front view of an illustrative lens in accordance with embodiments.

FIG. 2 is a front view of an illustrative lens for device 10. A shown in FIG. 2, lens 34 may be surrounded by flexible lens mount 40. Lens mount 40 may include one or more flexures. In an illustrative embodiment, lens mount 40 contains a ring-shaped flexure that runs around the entire perimeter of lens 34. Arrangements in which mount 40 includes a number of separate segments (see, e.g., illustrative segment SG) each of which has a separate strip-shaped flexure segment or in which mount 40 includes discrete flexures such as illustrative discrete flexure DL (e.g., a set of three discrete flexures attached to the periphery of lens 34 at three evenly spaced locations along the periphery) may also be used. Support 38 may be attached to mount 40 along the outer peripheral edge of mount 40 or support 38 may be attached to mount 40 where support 38 overlaps mount 40 (sec, e.g., FIG. 3).

Figure 3:
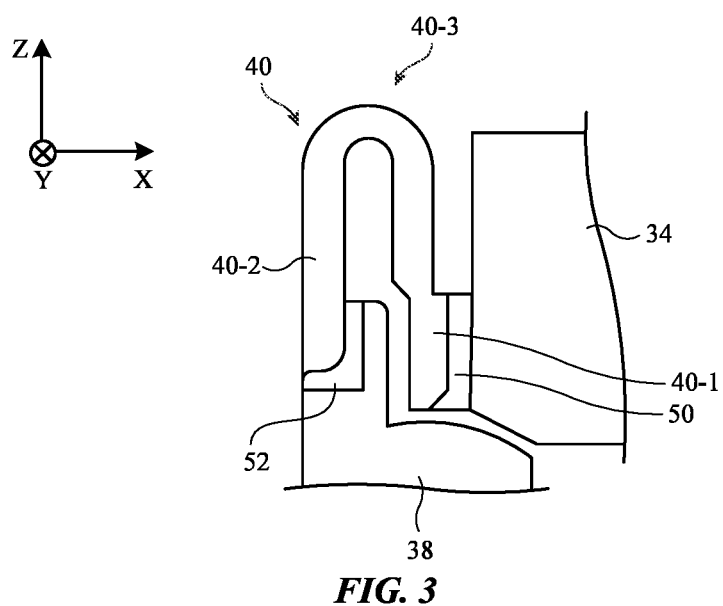
FIGS. 3 and 4 are cross-sectional side view of peripheral portions of illustrative lenses and associated mounting structures in accordance with embodiments.

FIG. 3 is a cross-sectional side view of an illustrative peripheral portion of lens 34 and mount 40 of FIG. 2 taken along line 42 of FIG. 2 and viewed in direction 44. As shown in FIG. 3, support (lens barrel) 38 may be overlapped by mount 40. Mount 40 may be formed from polymer, metal, or other material that is shaped to form a flexure. In the example of FIG. 3, mount 40 is a ring-shaped flexure with a U-shaped cross section that runs along the ring-shaped peripheral edge of lens 34. First portion 40-1 of the flexure is attached to the peripheral edge of lens 34 with a first ring of adhesive 50 and second portion 40-2 of the flexure is attached to support 38 with a second ring of adhesive 52. Bend 40-3 runs along mount 40 between portions 40-1 and 4-2 and allows mount 40 to flex. For example, portion 40-1 may move radially outwardly towards portion 40-2 when lens 34 expands radially due to an increase in operating temperature. The metal of support 38 has a significantly lower coefficient of thermal expansion than the polymer of lens 34, but is separated by an air gap from the edge of lens 34, so that lens 34 can expand radially outwardly without contacting support 38 and is therefore not stressed due to pressure from contact with support 38.

Mount 40 may, if desired, be formed from a material such as polyetherimide (PEI) or other rigid polymer that exhibits a high yield strength and a high elongation-to-failure value. The elastic modulus of the material forming mount 40 may be, for example, at least 1.5 GPa, at least 2 GPa, or at least 3 GPa, as examples. The high strength and high rigidity of the material forming mount 40 helps mount 40 accurately hold lens 34 in place. The material of mount 40 may exhibit a yield strength (e.g., at least 30 MPa, at least 70 MPa, or at least 100 MPa), so that mount 40 exhibits a good yield-strength-to-stiffness ratio. To provide mount 40 with satisfactory durability, it may be desirable for the material of mount to have an elongation-to-failure value of at least 25%, at least 35%, or at least 40%. To ensure satisfactory attachment of mount 40 with adhesive 52 and 50, the material of mount 40 preferably also exhibits satisfactory compatibility (bond strength) with adhesives 52 and 50. Adhesives 52 and 50 may be, for example, epoxy, so the material of mount 40 preferably forms satisfactory bonds with epoxy. The coefficient of thermal expansion of the material of mount 40 may be matched (e.g., within 20%, within 10%, within 5%, or within 2%) to the coefficient of thermal expansion of the material of lens 34. In this way, lens stress can be avoided that might otherwise be imposed by mount 40 on lens 34 if, for example, the perimeter of mount 40 were to expand less quickly than the perimeter of lens 34 as a function of increasing operating temperature and thereby constrain the expansion of lens 34. Other types of materials may be used in forming mount 40, if desired. The use of polyetherimide that is matched to the polymer of lens 34 in its coefficient of thermal expansion and that exhibits high yield strength and high elongation-to-failure values is illustrative.

Figure 4:
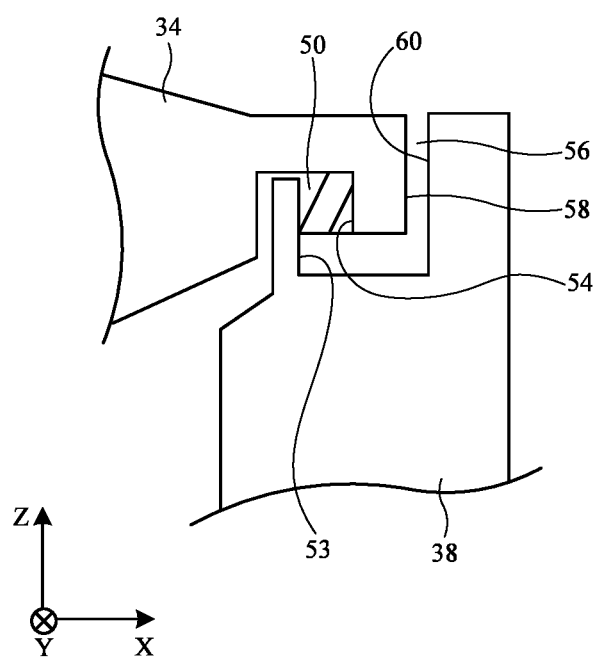

If desired, thermally induced lens stress may be minimized using a reverse flange adhesive attachment arrangement of the type shown in FIG. 4. With this type of arrangement, lens 34 may be provided with a milled flange that is bonded to a surface of support 38 that faces radially outward (away from lens 34). As shown in FIG. 4, adhesive 50 (e.g., a soft adhesive) may be used to attach outwardly facing surface 53 of support 38 to opposing inwardly faced milled flange surface 54 of lens 34. An air gap such as air gap 56 is preferably present between outer peripheral edge surface 58 of lens 34 and opposing inwardly facing surface 60 of support 38, thereby ensuring that the periphery of lens 34 (surface 58) will not contact support 38 and will therefore not receive stress from support 38 even as lens 34 expands radially outward as a function of increasing operating temperature.

Figure 5:
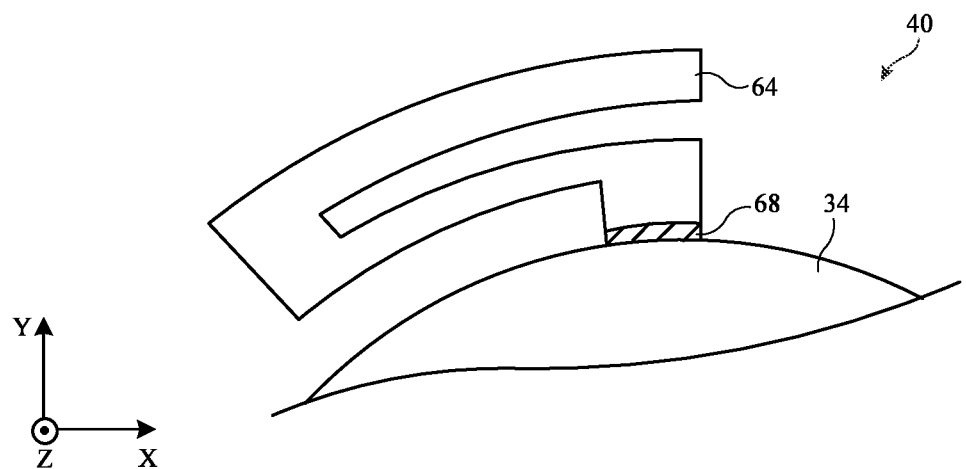
FIGS. 5 and 6 are top views of illustrative flexures for mounting a lens in accordance with embodiments.
Figure 6:
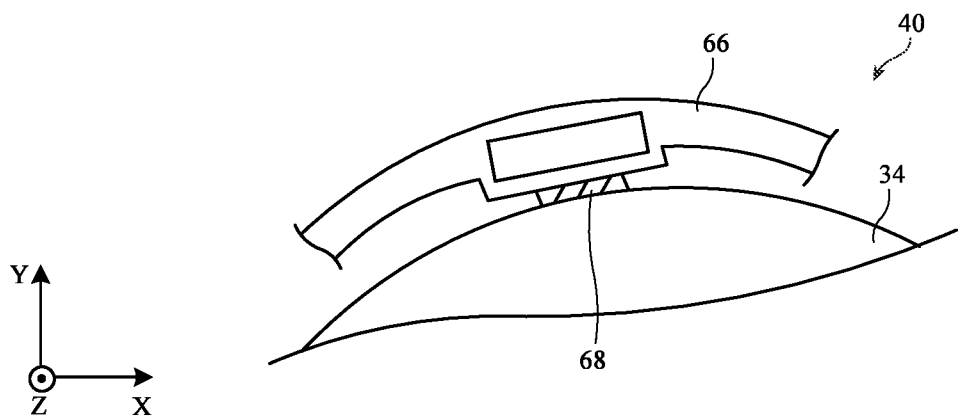

If desired a set of discretely located flexures such as the illustrative flexures of FIGS. 5 and 6 may also be used in supporting lens 34 (e.g., at three points along the perimeter of lens 34). In the examples of FIGS. 5 and 6, lens 34 is viewed from the rear of device 10 (e.g., along the Z axis). One side of illustrative flexures 64 and 66 may be attached to the periphery of lens 34 using adhesive 68 and another side of flexures 64 and 66 may be attached to support 38 (e.g., using adhesive, screws or other fasteners, etc.). During fluctuations in operating temperature, lens 34 may expand radially outward and may contract radially inward. With the flexure arrangements of FIGS. 5 and 6, flexures 64 and 66 may radially flex to accommodate the lens expansion and contraction, while accurately maintaining a desired mounting location for lens 34 within support 38. In arrangements in with flexures are located at discrete locations around the periphery of lens 34 (e.g., three discrete locations), sealing structures (e.g., ring-shaped elastomeric boots) may be used to help seal the periphery of lens 34 against support 38 and thereby prevent dust and moisture ingress into assembly 20. As with the ring-shaped flexure of FIGS. 2 and 3, the discrete flexures of FIGS. 5 and 6 may be used to maintain lens 34 in a satisfactory position (without significant lateral shifting in X and Y position and without significant tilt away from the Z axis) while flexing to accommodate expansion and contraction due to temperature changes. The strength of mount 40 may help assemblies 20 resist plastic deformation and other damage during drop events and other undesired impacts leading to excessive stress.

Figure 7:
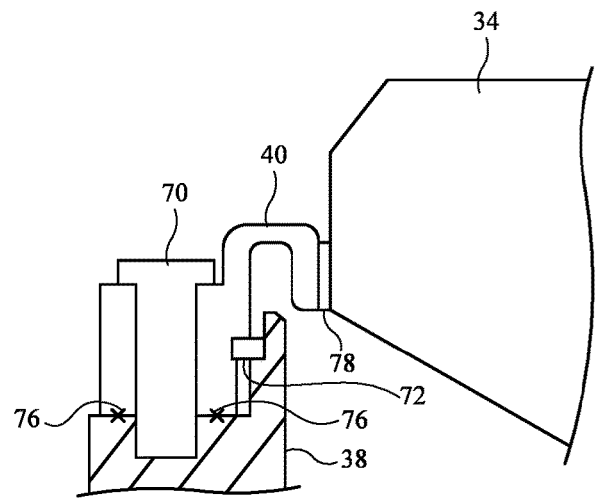
FIGS. 7, 8, 9, and 10 are cross-sectional side views of additional illustrative flexure arrangements for mounting a lens in accordance with embodiments.
Figure 8:
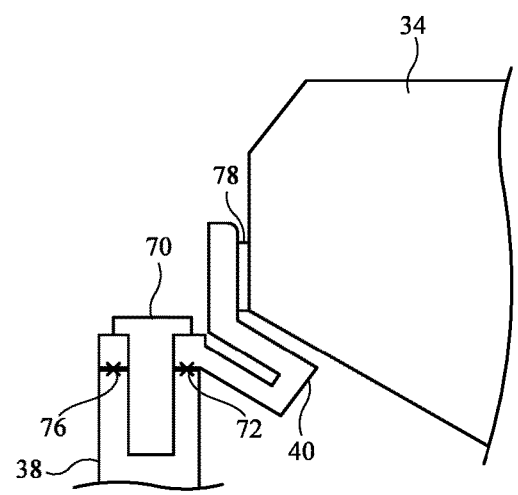
Figure 9:
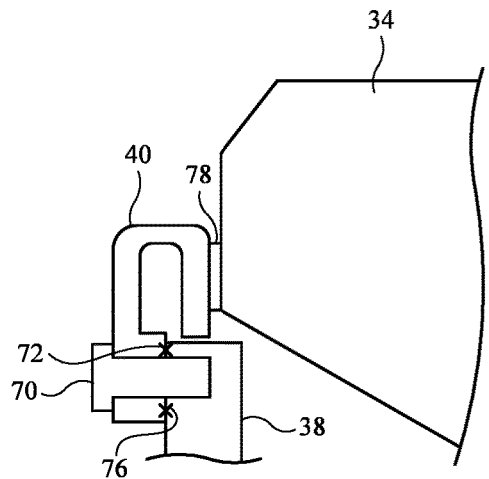

FIGS. 7, 8, 9, and 10 are illustrative cross-sectional side views of illustrative flexures for mount 40. The flexures of FIGS. 7, 8, 9, and 10 may extend in a continuous ring around the periphery of lens 34, may be formed from a number of segments that extend around lens 34, or may be formed from discretely located flexures (as shown, for example, in FIGS. 5 and 6). In the arrangements of FIGS. 7, 8, and 9, mount 40 has a U-shaped cross-sectional shape.

In the example of FIG. 7, screw 70 attaches mount (flexure) 40 to support 38 and adhesive 78 attaches mount 40 to lens 34. When using a screw such as screw 70 to attach mount 40 to support 38 instead of adhesive, a separate seal such as seal 72 may be used to seal lens 34 to support 38 and thereby help prevent moisture and dust ingress into the interior of assembly 20. Seal 72 may be an O-ring formed from an elastomeric gasket material, may be a ring of adhesive (e.g., pressure sensitive adhesive or other soft sealing adhesive), or may be other sealant. If desired, adhesive 76 may be provided at the interface between mount 40 and support 38 (e.g., epoxy or other rigid adhesive) and may be used both to attach mount 40 to support 38 and to seal mount 40 to support 38. The use of screws such as screw 70 of FIG. 7 to attach mount 40 to support 38 is illustrative.

Figure 10:
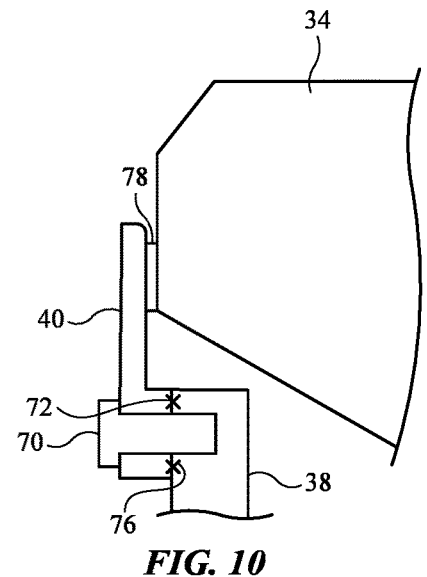

The illustrative configurations of FIGS. 8, 9, and 10 may also involve the use of screws 70, adhesive 76, and/or seal 72 to attach and seal mount 40 to support 38. In the example of FIG. 8, mount 40 protrudes inwardly under the outer edge of lens 34. In the example of FIG. 9, screw 70 extends radially inward towards the center of lens 34. In the example of FIG. 10, the flexure formed by mount 40 does not have a central bend, but rather relies on its length to ensure that sufficient flexure bending is available to accommodate radial outward expansion of lens 34 as operating temperatures rise.

Figure 11:
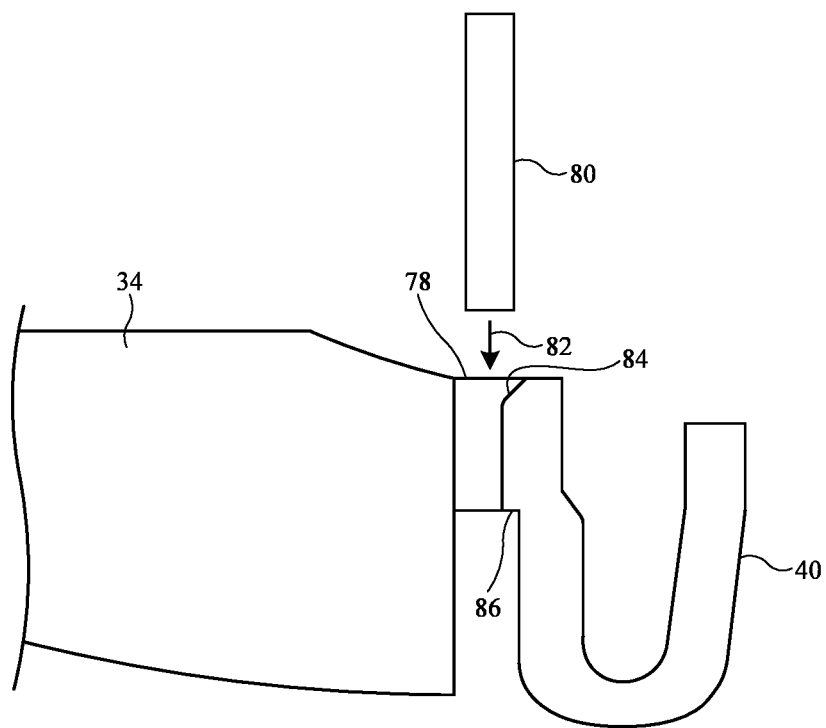
FIG. 11 is a diagram showing how adhesive may be introduced into a gap between an illustrative flexure and a lens in accordance with an embodiment.

The diagram of FIG. 11 shows how adhesive 78 may be dispensed to attach mount 40 to the outer edge of lens 34. In the example of FIG. 11, lens 34 and mount 40 have been flipped upside down relative to the orientation of FIG. 3. As shown in FIG. 11, mount 40 may have a chamfer such as chamfer 84 that locally widens the gap between lens 34 and mount 40 to facilitate the introduction of liquid adhesive into this gap. Adhesive may be dispensed in liquid form in direction 82 from dispenser 80 and may then be drawn into the gap between mount 40 and lens 34 by capillary action. After the liquid adhesive material has been drawn into the gap, the adhesive may be cured to form adhesive 78 (e.g., using ultraviolet light curing, curing using a two-part adhesive arrangement, etc.). To help control the downward progress of adhesive 78 while adhesive 78 is liquid, mount 40 may be provided with a stop feature such as step 86. The presence of step 86 on the inwardly facing surface of mount 40 creases a surface tension break that stops the downward flow of adhesive 78 when flowing into the joint between lens 34 and mount 40. In this way, the dispensing of adhesive 78 may be limited to a desired bonding area between mount 40 and lens 34.

To help protect the privacy of users, any personal user information that is gathered by device 10 may be handled using best practices. These best practices including meeting or exceeding any privacy regulations that are applicable. Opt-in and opt-out options and/or other options may be provided that allow users to control usage of their personal data.

The foregoing is merely illustrative and various modifications can be made to the described embodiments. The foregoing embodiments may be implemented individually or in any combination.

What is claimed is:
1. A head-mounted device, comprising:
a head-mounted housing;
optical assemblies in the head-mounted housing that are configured to provide images to eye boxes, wherein each optical assembly includes:
a display;
a lens barrel coupled to the display;
a lens, wherein the lens comprises a first material with a first coefficient of thermal expansion; and
a flexure coupled between the lens and the lens barrel, wherein the flexure comprises a second material that is different from the first material, and the second material has a second coefficient of thermal expansion that is within 10% of the first coefficient of thermal expansion.

2. The head-mounted device defined in claim 1 wherein the lens comprises a catadioptric lens.

3. The head-mounted device defined in claim 1 wherein the flexure comprises a ring with a U-shaped cross-sectional shape.

4. The head-mounted device defined in claim 1 wherein the first material comprises a first polymer and wherein the second material comprises a second polymer that is different than the first polymer.

5. The head-mounted device defined in claim 4 wherein the second polymer comprises polyetherimide.

6. The head-mounted device defined in claim 5 wherein the first polymer comprises cyclic olefin polymer.

7. The head-mounted device defined in claim 1 wherein the lens comprises a catadioptric lens with a peripheral edge and wherein the flexure comprises a polymer ring with a U-shaped cross-sectional shape that extends around the peripheral edge.

8. The head-mounted device defined in claim 7 wherein the lens barrel comprises a metal lens barrel and wherein the catadioptric lens comprises polymer.

9. A head-mounted device optical module, comprising:
a tube-shaped metal support having opposing first and second ends;
a display coupled to the first end;
a catadioptric lens having a peripheral edge; and
a flexure having a first portion attached to the tube-shaped metal support at the second end, having a second portion attached to the peripheral edge, and having a bend between the first and second portions, wherein the flexure comprises a material having an elastic modulus of at least 2 GPa and a yield strength of at least 70 MPa.

10. The head-mounted device optical module defined in claim 9 wherein the material has a coefficient of thermal expansion that is matched to that of the catadioptric lens within 10%.

11. The head-mounted device optical module defined in claim 9 further comprising epoxy that attaches the second portion to the peripheral edge.

12. The head-mounted device optical module defined in claim 9 further comprising epoxy that attaches the first portion to the tube-shaped metal support.

13. The head-mounted device optical module defined in claim 9 further comprising a screw that attaches the first portion to the tube-shaped metal support.

14. The head-mounted device optical module defined in claim 13 further comprising a ring-shaped seal between the tube-shaped metal support and the flexure.

15. The head-mounted device optical module defined in claim 9 wherein the flexure has a U-shaped cross-sectional shape and the material comprises polymer.

16. The head-mounted device optical module defined in claim 15 wherein the polymer has an elongation-to-failure value of at least 30%.

17. A head-mounted device, comprising:
a head-mounted housing;
optical assemblies in the head-mounted housing that are configured to provide images to eye boxes, wherein each optical assembly includes:
  a display;
  a lens support coupled to the display;
  a polymer catadioptric lens; and
  a lens mount having a set of three flexures, each coupled between the polymer catadioptric lens and the lens support at a different location along a peripheral edge of the polymer catadioptric lens.

18. The head-mounted device defined in claim 17 wherein the lens support comprises a metal lens support having a tubular shape and wherein at least one flexure of the set of the three flexures comprises a polymer ring with a U-shaped cross-sectional shape.

* * * * *